United States Patent
Suelberg

(10) Patent No.: US 10,482,443 B2
(45) Date of Patent: Nov. 19, 2019

(54) SYSTEM AND METHODS ASSOCIATED WITH VENDING MACHINE TELEMETRY, REPLENISHMENT, AND CONFIGURATION UTILIZING MULTIPLE TYPES COMMUNICATION NETWORKS

(71) Applicant: Thilo Suelberg, Austin, TX (US)

(72) Inventor: Thilo Suelberg, Austin, TX (US)

(73) Assignee: Katzenfreunde LLC, Austin, TX (US)

( * ) Notice: Subject to any disclaimer, the term of this patent is extended or adjusted under 35 U.S.C. 154(b) by 228 days.

(21) Appl. No.: 15/590,731

(22) Filed: May 9, 2017

(65) Prior Publication Data

US 2017/0330164 A1    Nov. 16, 2017

Related U.S. Application Data

(60) Provisional application No. 62/349,140, filed on Jun. 13, 2016, provisional application No. 62/334,714, filed on May 11, 2016.

(51) Int. Cl.
| | |
|---|---|
| *G06Q 20/20* | (2012.01) |
| *G06Q 10/08* | (2012.01) |
| *G06Q 30/06* | (2012.01) |
| *G06Q 30/02* | (2012.01) |
| *G07F 11/00* | (2006.01) |

(52) U.S. Cl.
CPC ......... *G06Q 20/203* (2013.01); *G06Q 10/087* (2013.01); *G06Q 20/202* (2013.01); *G06Q 30/0613* (2013.01); *G07F 11/00* (2013.01); *G06Q 10/08* (2013.01); *G06Q 30/02* (2013.01); *G06Q 30/0643* (2013.01)

(58) Field of Classification Search
CPC .... G06Q 10/08; G06Q 10/087; G06Q 20/202; G06Q 20/203; G06Q 30/02; G06Q 30/08; G06Q 30/0613; G06Q 30/0643; G07F 11/00
USPC .................................................. 700/231–244
See application file for complete search history.

(56) References Cited

U.S. PATENT DOCUMENTS

| | | | | |
|---|---|---|---|---|
| 6,584,309 | B1 * | 6/2003 | Whigham | G06Q 10/087 455/407 |
| 6,784,874 | B1 * | 8/2004 | Shimizu | G06Q 20/00 345/169 |
| 7,079,922 | B2 * | 7/2006 | Komai | G06Q 20/206 455/420 |
| 8,774,963 | B2 * | 7/2014 | Signorelli | G06Q 20/20 700/232 |
| 10,109,143 | B2 * | 10/2018 | Signorelli | G06Q 20/20 |
| 2002/0128932 | A1 * | 9/2002 | Yung | G06Q 10/087 705/26.1 |
| 2005/0228720 | A1 * | 10/2005 | Pavlic | G06Q 20/04 705/16 |
| 2014/0309770 | A1 * | 10/2014 | Signorelli | G06Q 20/20 700/232 |
| 2019/0057569 | A1 * | 2/2019 | Signorelli | G06Q 20/20 |

* cited by examiner

*Primary Examiner* — Michael Collins
(74) *Attorney, Agent, or Firm* — Pierson IP, PLLC

(57) ABSTRACT

Embodiments described herein relate to a universal vending machine closed-loop sales optimization device. The vending machine device may be configured to be installed within a vending machine, and be communicatively coupled with a vending machine controller. The vending machine device may be configured to receive data and transmit data.

20 Claims, 6 Drawing Sheets

SYSTEM AND METHODS ASSOCIATED WITH VENDING MACHINE TELEMETRY, REPLENISHMENT, AND CONFIGURATION UTILIZING MULTIPLE TYPES COMMUNICATION NETWORKS

CROSS-REFERENCE TO RELATED APPLICATIONS

This application claims a benefit of priority under 35 U.S.C. § 119 to Provisional Application Nos. 62/334,714 filed on May 11, 2016 and 62/349,140 filed on Jun. 13, 2016, which are fully incorporated herein by reference in its entirety.

TECHNICAL FIELD

Embodiments disclose systems and methods associated with vending machine telemetry, replenishment, and configuration utilizing multiple types of communication networks. Specifically, embodiments are directed towards a device that is configured to be coupled with a vending machine bus and/or vending machine controller to track sales or manage configurations, while also being configured to communicate data to a replenishment driver and/or a backend server. Furthermore, the device may be configured to communicate data to a user's computing device, which may relay the data to the backend server.

BACKGROUND

A vending machine is an automatic machine that sells and dispenses various items, such as food, drinks, or other items including newspapers, cigarettes, electronics, etc. Vending machines are widely used to sell products outside a store, in remote locations, or during off-hours.

To dispense items, vending machines require frequent replenishment. This is particularly necessary in the food and beverage industry where most products have an expiration date. Due to the expiration of products stored and sold via the vending machine, it is important to know the refill quantity and next refill date.

Currently, to restock a vending machine, a driver must visit an existing vending machine, determine what products need to be restocked, return to their truck, and restock the vending machine. This process leads to drivers needing to make unnecessary trips to the vending machine, have too many or too few items to be restocked, etc. This process does not allow for real time tracking of items being sold by the vending machine or dynamic pricing models. Furthermore, because many vending machines are located in remote locations, the vending machines may not be connected to various networks.

Accordingly, needs exist for systems and methods utilizing dual pathways to communicate vending machine data to a backend server, wherein the dual pathways reduce the costs associated with data transfers.

SUMMARY

Embodiments described herein relate to a universal vending machine systems and methods that are configured to transmit data to a backend server over multiple pathways and/or networks. The vending machine device may be configured to be installed within a vending machine, and be communicatively coupled with a vending machine bus and/or controller. The vending machine device may be configured to receive data and transmit data directly to a backend server or relay data to the backend server through user computing devices responsive to a user completing a transaction with the vending machine.

The vending machine device may be configured to receive data associated with the status of the vending machine, such as sales, technical issues, or out-of-stock situations. The vending machine device may be configured to transmit the collected data and receive configurations commands. The vending machine device may be configured to transmit first data at fixed intervals or on a schedule directly to the backend server. Additionally, the vending machine device may be configured to relay second data through a user computing device responsive to a user completing a transaction with the vending machine using the user computing device and a user interface on the vending machine, wherein the user interface on the vending machine is utilized to make a selection of items stored within the vending machine. In embodiments the first data may include more data than the second data, wherein the first data includes comprehensive data associated with the vending machine, and the second data may include a binary flags associated with the purchased item and/or the vending machine. The binary flags may indicate whether the purchased item needs to be restocked.

Responsive to receiving the configuration commands, the vending machine device may control the vending machine controller to optimize the vending machine, such as change pricing models. In embodiments, the vending machine device may be configured to determine dynamic pricing rules for the vending machine based on business rules.

In further embodiments, the vending machine device may be configured to receive and transmit data to an associated party via a text message. The associated party may transmit a message to the vending machine device to change configurations associated with the vending machine, such as a column or selector layout, product pricing, or consignment setting via the text message without having to visit the vending machine.

Additionally, upon arriving at location associated with a vending machine, a replenishment driver may transmit a text message to the vending machine device. In response, the vending machine device may transmit data identifying exact quantities for products and money refills associated with the vending machine.

In embodiments, the vending machine device may be configured to communicate data over wired protocols, such as USB ports, or via wireless protocols, such as WiFi, Bluetooth, etc.

These, and other, aspects of the invention will be better appreciated and understood when considered in conjunction with the following description and the accompanying drawings. The following description, while indicating various embodiments of the invention and numerous specific details thereof, is given by way of illustration and not of limitation. Many substitutions, modifications, additions, or rearrangements may be made within the scope of the invention. The invention includes all such substitutions, modifications, additions or rearrangements.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

Figure 1:
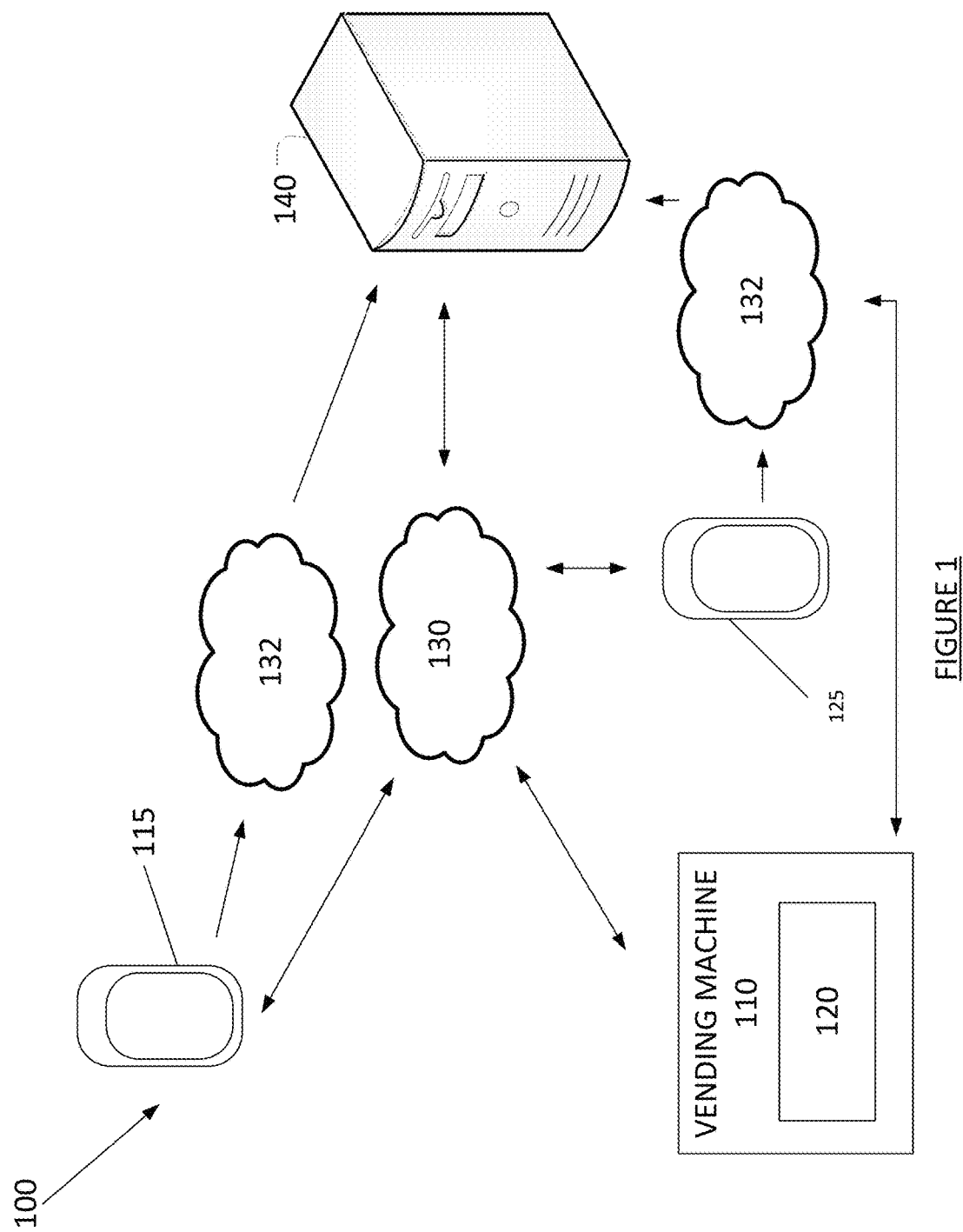
FIG. 1 depicts a perspective view of a topology utilizing a vending machine device, according to an embodiment.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present disclosure. Also, common but well-understood elements that are useful or necessary in a commercially feasible embodiment are often not depicted in order to facilitate a less obstructed view of these various embodiments of the present disclosure.

DETAILED DESCRIPTION

In the following description, numerous specific details are set forth in order to provide a thorough understanding of the present invention. It will be apparent, however, to one having ordinary skill in the art that the specific detail need not be employed to practice the present invention. In other instances, well-known materials or methods have not been described in detail in order to avoid obscuring the present invention.

FIG. 1 depicts a perspective view of a topology 100 utilizing a vending machine device 120, according to an embodiment. Topology 100 may include a vending machine 110, a replenishment driver computing device 115, user computing device 125, networks 130 and 132, and backend server 140.

Vending machine 110 may be a device that is configured to dispense items such as snacks, beverages, newspapers, alcohol, cigarettes, electronics, etc. Vending machine 110 may include a selection interface where a user may perform commands to select a specific item to be dispensed from the vending machine 110, a money input where a user may insert money for the selected item, a dispenser configured to dispense the selected item, and a change return mechanism configured to return change to the user.

Vending machine 110 may also include a computer with a processor. The computer may include a computer bus and/or a digital data interface. The computer bus may be configured to connect the components of vending machine 110 to an electrical circuit. Furthermore, the computer bus may be configured to interface different payment systems of vending machine 110, such as a wireless payment interface and the money input. The digital data interface may be configured to provide audit capabilities of vending machine 110, which audit the inventory and status information of vending machine 110. The digital exchange may be configured to determine and communicate data such as sales, cash, coins, sales of units by selection, pricing, door openings, etc. In embodiments, the computer bus and the digital exchange may be configured to determine sales data and configuration data associated with the vending machine 110. Vending machine may include a vending machine device 120 that is configured to connect to the computer bus and/or the digital data interface. For example, the vending machine device 120 may manage the configurations data utilized to set the settings, price data, and other functionalities of vending machine 110. The vending machine 110 may also include a user interface that allows a user to interact with vending machine 110 to make a selection of goods stored within the vending machine 110.

Replenishment driver computing device 115 may be any other type of mobile device with a hardware processor that is configured to process instructions and connect to vending machine device 120 over networks 130, 132 one or more portions of networks 130, 132. Replenishment driver computing device 115 may be configured to receive data associated with the status of vending machine 110 from vending machine device 120 via the computer bus or digital exchange over network 130. For example, replenishment driver computing device 115 may be configured to receive sales data, pricing data, restocking data, cash data, coin data, etc. from vending machine device 120 responsive to replenishment driver computing device 115 being in close proximity to vending machine device 120. Utilizing the data, a driver may be able to determine a replenishment status associated with vending machine 110. Furthermore, replenishment driver computing device 115 may be configured to relay data received from vending machine device 120 to backend server 140 over network 132. In embodiments, replenishment driver computing device 115 may be configured to receive data from vending machine device 120 over network 130 while replenishment driver computing device 115 is not connected to network 132. Responsive to replenishment driver computing device 115 becoming online network 132, replenishment driver computing device 115 may relay received data to backend server 140 over network 132. Additionally, upon arriving at location associated with a vending machine 110, a replenishment driver may transmit a text message to the vending machine device, and in response the vending machine device 120 may transmit data identifying exact quantities for products and money refills associated with the vending machine 110.

User computing device 125 may be any other type of mobile device with a hardware processor that is configured to process instructions and connect to vending machine device 120 over networks 130, 132 one or more portions of networks 130, 132. User computing device 125 may be utilized by a user to purchase goods sold by vending machine 110. Responsive to the user completing a transaction with vending machine 110 utilizing the interface on vending machine 110 and user computing device 125, vending machine device 120 may communicate a second set of data to user computing device 125, which subsequently relays this data to backend server 140 over network 132. The second set of data may be different than that received by replenishment driver computing device 115. Furthermore, in embodiments, user computing device 125 may be configured to receive data from vending machine device 120 over network 130 while user computing device 125 is not connected to network 132. Responsive to user computing device 125 becoming online network 132, user computing device 125 may relay the second set of data to backend server 140 over network 132.

Backend server 140 may be a computer server or any other type of device with a hardware processor configured to process instructions and connect to networks 130, 132, one or more portions of networks 130, 132. Backend server 140 may be positioned in a remote from vending machine 110. In embodiments, vending machine device 110 may not be directly connected to network 132. Backend server 140 may be configured to receive and/or transmit information associated with an inventory of the vending machine 110, pricing of items carried by vending machine 110, business rules associated with vending machine 110, configurations associated with vending machine 110, sales data associated with vending machine 110, etc. over network 130. Utilizing backend server 140, a user may be able to remotely configure vending machine 110, while also viewing sales data associated with vending machine 110.

Network 130 may be a first type of network. For example, network 130 may be a wireless local area network (WLAN, Wi-Fi), Bluetooth, NFC, or local area network (LAN) that is configured to link two or more devices within a limited area. Network 130 may be configured to allow for data transmission over a closed loop network by users with network credentials. It will be understood that network 130 may be a combination of multiple different kinds of wired or wireless networks operating over a second network protocol.

Network 132 may be a second type of network. Network 132 may be a wide area network (WAN) that extends over a large geographical distance. First type of network 132 may be a wireless communications network, digital radio, or cellular network operating over CDMA, GSM, etc. Network 132 may be operated by telecommunications providers. In embodiments, network 132 may allow for a higher reliability of data communications than second type of network 132. However, transmitting data over first type of Network 132 may have a higher cost associated with transmitting data over s Network 130. It will be understood that network 132 may be a combination of multiple different kinds of wired or wireless networks operating over a first network protocol. In embodiments, network 130 may have a lower cost associated with transmitting data than network 132, and network 130 may be able to communicate data at higher speeds and with more bandwidth than network 132.

Figure 2:
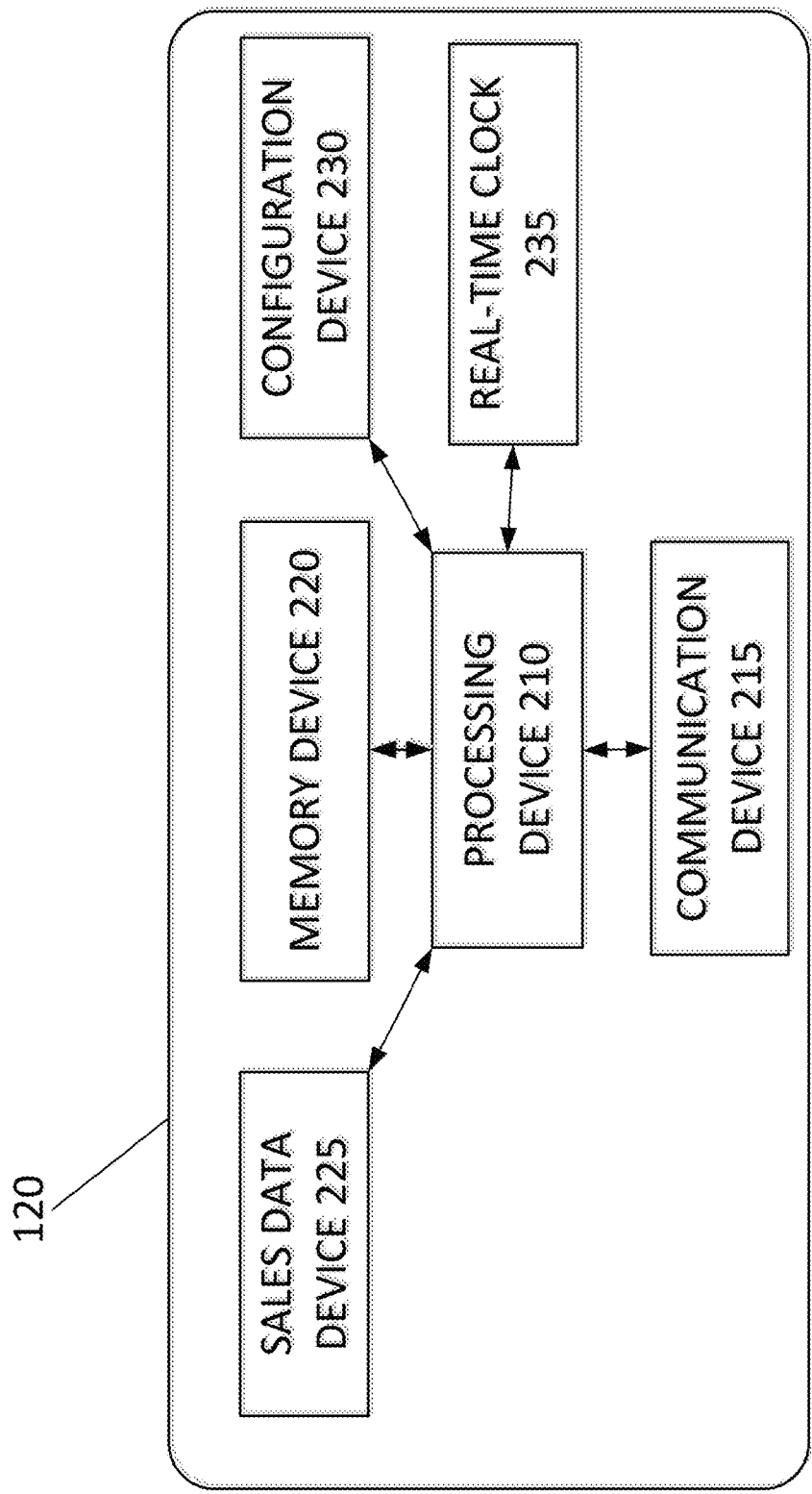
FIG. 2 depicts a vending machine device, according to an embodiment.

FIG. 2 depict vending machine device 125, according to an embodiment. Vending machine device 125 may be configured to communicate first data over network 130 to backend server 140, and to communicate second data over network 130 to user computing device 125, wherein the second data is then automatically relayed over network 132 to backend server 140.

Vending machine device 120 may be a computing device that is configured to couple with computing devices of vending machine 110, replenishment driver computing device 115, user computing device 125, or backend server 140 over network 130. Vending machine device 120 may include a processing device 210, communication device 215, memory device 220, sales data device 225, a configuration device 230, and real-time clock 235.

The processing device 210 can include memory, e.g., read only memory (ROM) and random access memory (RAM), storing processor-executable instructions and one or more processors that execute the processor-executable instructions. In embodiments where the processing device 210 includes two or more processors, the processors may operate in a parallel or distributed manner. The processing device 210 may execute an operating system of vending machine device 120 or software associated with other elements of consumer vending machine device 120.

The communications device 215 may be a device that allows vending machine device 120 to communicate with another device, e.g., a replenishment driver computing device 115, user computing device 125, and/or a backend server 140. The communications device 215 may include one or more wireless transceivers for performing wireless communication and/or one or more communication ports for performing wired communication. The communication device 215 may have a first network interface and a second network interface. The first network interface may be configured to communication with external devices, such as a replenishment driver computing device 140, and the second network interface may be configured to communicate with internal devices, such as computing elements of vending machine 110. The first network interface may include a USB port, Wi-Fi, NFC, Ethernet port, Bluetooth, SMS network, CDMA, GSM, and other digital networks operated by cell phone providers, etc. The second type of network may be a wired network connection with the bus and digital exchange of vending machine 110.

The memory device 220 may be a device that stores data generated or received by vending machine device 120. The memory device may include, but is not limited to a hard disc drive, an optical disc drive, EEPROM and/or a flash memory drive. In embodiments, the memory device 220 may be configured to store information received from the computing devices associated with the vending machine or remote computing devices.

The sales data device 225 may be configured to receive sales data from the vending machine 110. The sales data may include data associated with what items were sold by vending machine 110 and at what time and price point. Furthermore, the sales data may also include data indicating a current stock level of each item stored within vending machine 110 and a maximum allowable stock carried for each item stored within vending machine 110. In embodiments, the sales data device 225 may be configured to transmit the sales data to backend server 140, user computing device 125, or to a driver replenishment computing device 115.

In embodiments, responsive to completing a transaction for an item sold by vending machine 110, sales data device 225 may communicate second data to user computing device 125 if the current stock level of the purchased item falls below an item threshold, which may be the same and/or different for each item within the vending machine 110. The second data may include an item identifier corresponding to the sold item, a binary flag indicating that the current stock level for the item is below the item threshold, a timestamp, and a unique identifier associated with vending machine 110. However, the second data may not include a full audit report of vending machine 110. The second data may be formatted in a second file format, while an audit report of vending machine (first data) may be formatted in a first file format.

The configuration data device 230 may be configured to receive data associated with configurations of vending machine 110. The configuration data device 230 may be configured to transmit first configuration data at fixed intervals or on a schedule. The first data may include a full audit report of vending machine. This may include data associated with sale prices for various items stored within vending machine 110, technical data associated with vending machine 110, business rules for vending machine 110, such as at what price point and when items should be sold by vending machine 110, or any other data that may be utilized to configure vending machine 110. The first data device may be configured to transmit data to backend server 140 or to the drive replenishment computing device 115. The transmitted and received first data may be sent over a wired connection or wireless connection, such as over a SMS network. In embodiments, the first data may include more data than the second data, and thus may require more bandwidth.

In embodiments, the configuration data device 230 may be utilized to configure the settings, price data, and other functionalities of vending machine 110. Responsive to receiving the configuration commands from backend server 140 and/or replenishment computing device 115, the configuration data device 230 may control the vending machine device 120 to optimize the vending machine 110. For example, the configuration data device 230 may be configured to receive pricing data to dynamically determine or change pricing rules for the vending machine 110 based on business rules. Therefore, an owner of the vending machine 110 may change configurations associated with the vending machine, such as a column or selector layout, product pricing, or consignment setting via the text message without having to visit the vending machine.

In embodiments, the real time clock device 235 may be utilized to provide accurate timestamps used by other components of the system. Real time clock device 235 may be configured to generate a timestamp upon determining the first data and/or the second data, wherein the timestamp is a sequence of characters or encoded information identifying when a certain event occurred. Another timestamp may be generated by real time clock device 235 responsive to vending machine device 120 transmitting data over first network 130 or second network 132. This may be advantageous due to the possibility that vending machine 110 may be offline and not be able to immediately communicate data.

Figure 3:
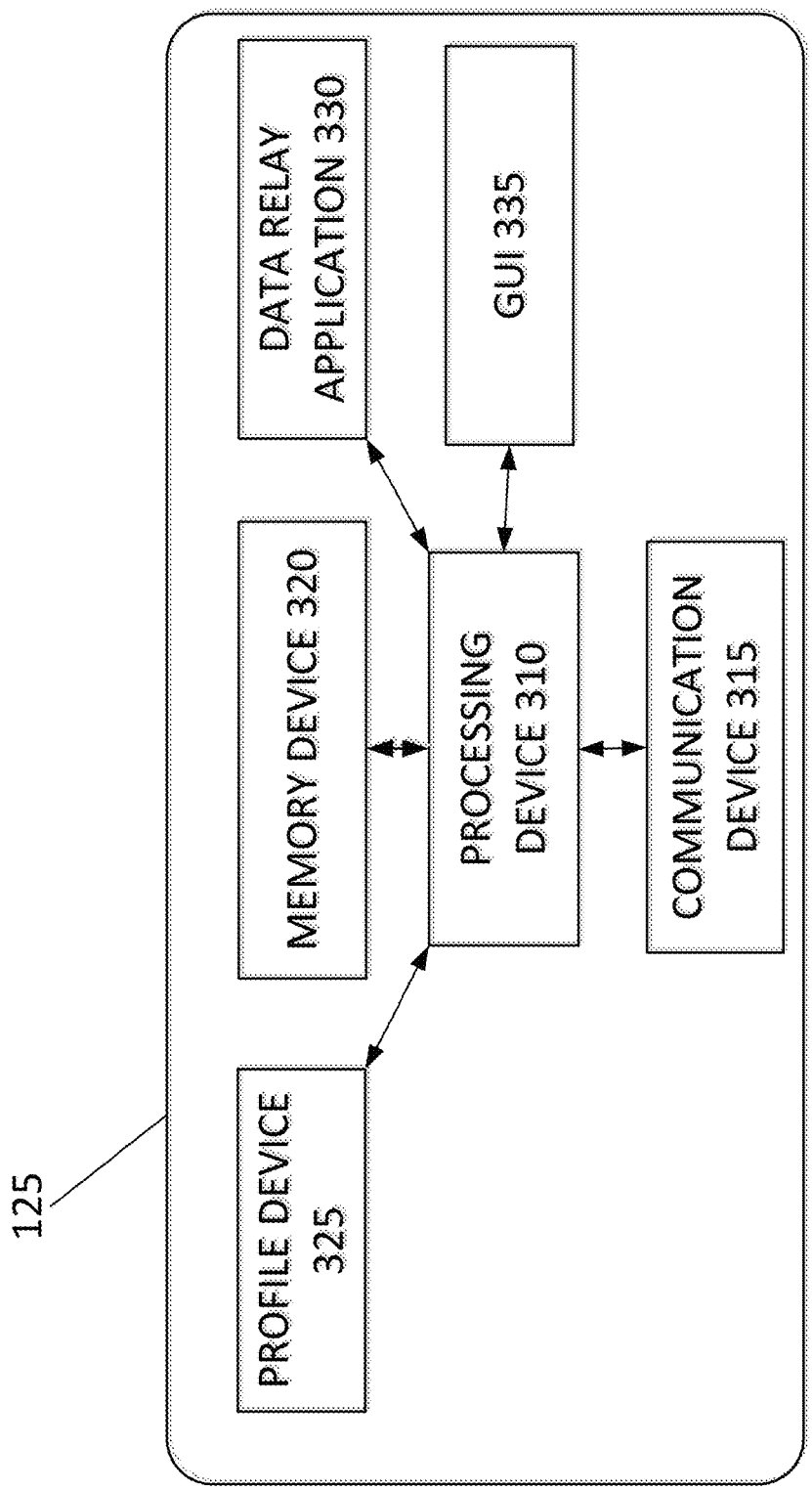
FIG. 3 depicts a user computing device, according to an embodiment.

FIG. 3 depict user computing device 125, according to an embodiment. User computing device 125 may include a processing device 310, communication devices 315, memory device 320, profile device 325, data relay application 330, and graphical user interface 335.

Processing device 310 may include memory, e.g., read only memory (ROM) and random access memory (RAM), storing processor-executable instructions and one or more processors that execute the processor-executable instructions. Processing device 310 may be configured to execute an operating system of user computing device 125. In embodiments where processing device 310 includes two or more processors, the processors may operate in a parallel or distributed manner.

Communication device 315 may be a device that allows user computing device 125 to communicate with another device over a wireless or wired network over networks 130, 132. Communication device 315 may include one or more wireless transceivers for performing wireless communication and/or one or more communication ports for performing wired communication. Communication device 315 may be configured to communicate data over a plurality of different standard and/or protocols.

Profile module device 325 may be a hardware processing device configured to create a profile for the user. The user's profiles may include for example, information identifying users (e.g., a username or handle, a number, an identifier, and/or other identifying information), security login information (e.g., a login code or password), payment information (e.g., credit card information), purchase history, etc.

Data Relay Application 330 may be a mobile application that allows a user to purchase goods sold or carried by vending machine 110 and receive data from vending machine device 120. Data relay application 330 may be able to store a pre-paid balance associated with the user's payment information, and utilizing an input from the user on GUI 335, data relay application 330 may transmit data associated with the user's current available balance to vending machine device 120. When vending machine device 120 receives the data from data relay application 330, vending machine device 120 may instruct operations to enable the selection of goods. For example, a user may perform actions to select an item to purchase on a graphical user interface on vending machine 110. Responsive to the user selecting an item on the graphical user interface of vending machine 110, Vending machine device 120 may send the unique identifier associated with the selected item along with the product price to data relay application 330 over the first network 130. Data relay application 330 may determine the new account balance and send an authorization message back to vending machine device 120 over first network 130. Vending machine 110 may dispense the selected item to the user. Vending machine device 120 may send a confirmation message to data relay application 330 over first network 130. Accordingly, vending machine 110 may utilize a graphical user interface physically located on vending machine 110 and data relay application 330 on user computing device 125 to purchase goods from vending machine 110. Furthermore, data relay application 330 may transmit information associated with the payment information and the amount of the item to backend server 140 responsive to the transaction being completed. Additionally, responsive to the transaction being completed, the payment information may receive a rebate, a free vend coupon, loyalty points, money, etc. (referred to hereinafter collectively and individually as "rebate"). The rebate may be received in exchange for relaying second data to backend server 140.

Furthermore, responsive to the transaction being completed data relay application 330 may receive second data from vending machine device 120. The second data may include inventory and status data, wherein the inventory data relates to items stored within vending machine 110 and the status data is associated with money stored within vending machine 110. In specific embodiments, the second data may include a time stamp, a unique identifier associated with vending machine 110, and a threshold flag, wherein multiple threshold flags may be set for different items. The threshold flag may indicate if a quantity of the item purchased by the user has fallen below an item threshold. If the quantity is below the threshold, the flag may be set, and corresponding second data may be transmitted to backend server 140. If the flag is not set (i.e. the quantity of the item is above or equal to the threshold), the second data may not be set. In further implementations, the threshold flag may be associated with money and specific demonetizations physically stored within vending machine 110. For example, if vending machine device 120 determines that an amount of quarters stored within vending machine 110 is below a threshold, the threshold flag may be set for an amount of quarters.

GUI 335 may be a device that allows a user to interact with user computing device 125. While one GUI 335 is shown, the term "user interface" may include, but is not limited to being, a touch screen, a physical keyboard, a mouse, a camera, a video camera, glasses presenting augmented reality to the consumer, a microphone, and/or a speaker. GUI 335 may include inputs where the user may complete a wireless transaction with goods with vending machine 110.

Figure 4:
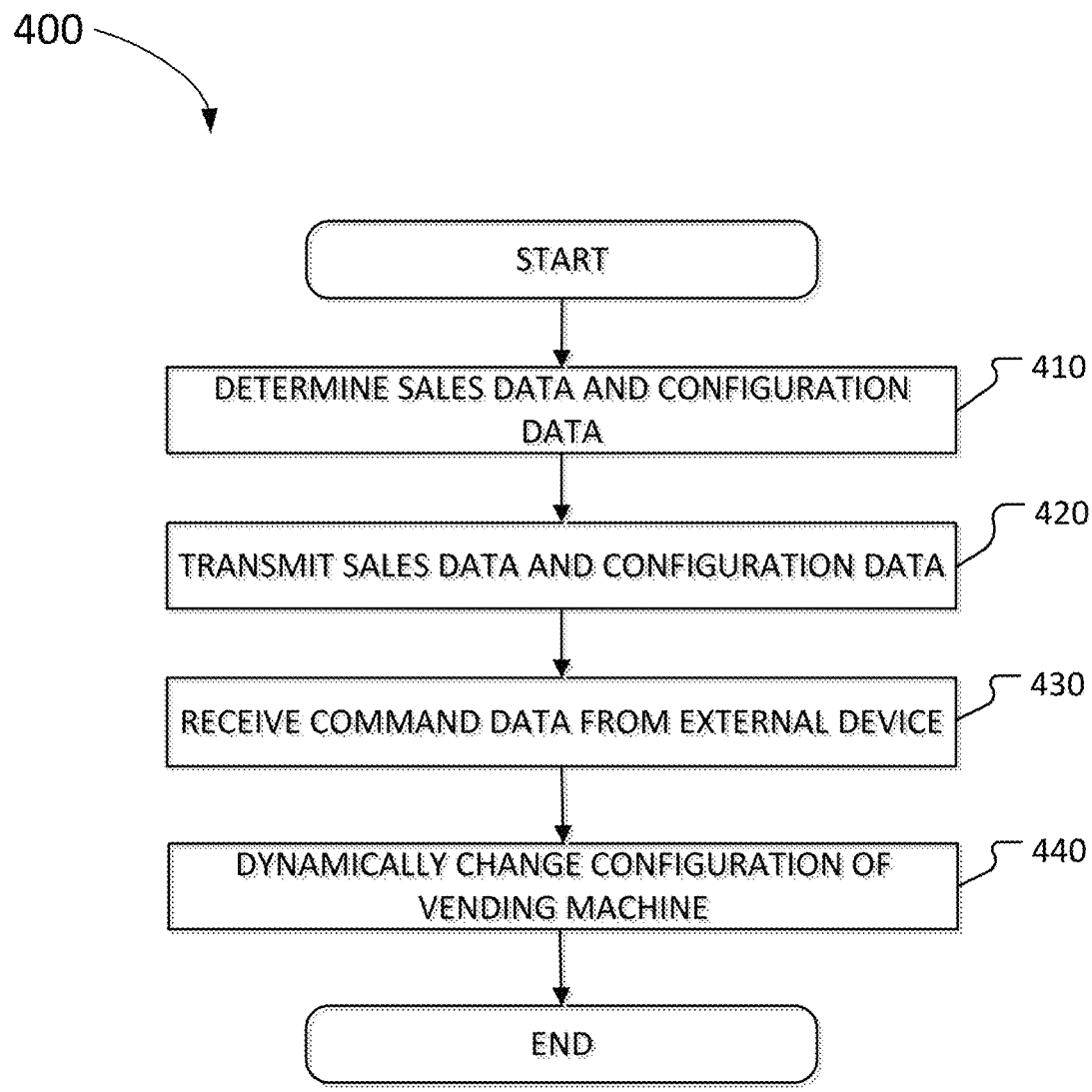
FIG. 4 depicts a method for a vending machine computing device controlling a vending machine, according to an embodiment.

FIG. 4 illustrates a method 400 for a vending machine computing device 120 controlling a vending machine 110. The operations of method 400 presented below are intended to be illustrative. In some embodiments, method 400 may be accomplished with one or more additional operations not described, and/or without one or more of the operations discussed. Additionally, the order in which the operations of method 400 are illustrated in FIG. 4 and described below is not intended to be limiting.

In some embodiments, method 400 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 400 in response to instructions stored electronically on an electronic storage medium. The one or more processing devices may include one or more devices configured through hardware, firmware, and/or software to be specifically designed for execution of one or more of the operations of method 400.

At operation 410, a vending machine device may determine the current status of a vending machine. The status of the vending machine may include sales data and configuration data.

At operation 420, the sales data and configuration data may be transmitted to a backend server or to replenishment driver computing device.

At operation 430, the vending machine device may receive data from the remote computing device or replenishment driver computing device. The received data may be received via an SMS text message.

At operation 440, the vending machine computing device may dynamically change the configuration of the vending machine responsive to receiving data from the replenishment driver computing device and/or the backend server. For example, pricing of items of the items stored within the vending machine may be changed via the received data. Therefore, a service technician may change the physical vending machine configuration, such as a column or selector layout, product pricing, or consignment settings. These new settings can be carried out automatically at any configurable point in time which may be a future point in time, without manual user intervention. Furthermore, these settings may be conditional based on data associated with the vending machine.

Figure 5:
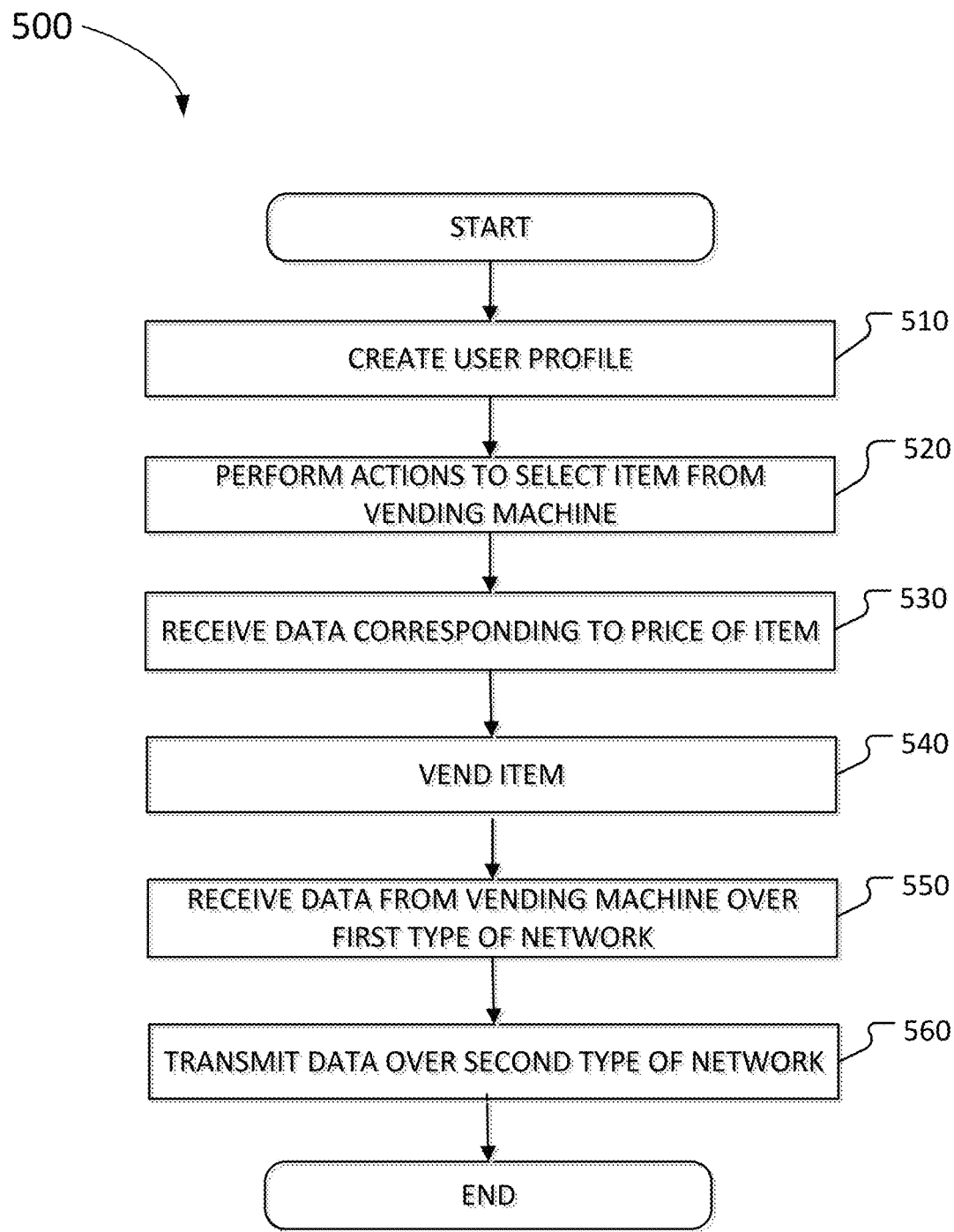
FIG. 5 illustrates a method for a vending machine computing device relaying data over different networks to a backend server, according to an embodiment.

FIG. 5 illustrates a method 500 for a vending machine computing device relaying data over different networks to a backend server, according to embodiments. By relaying data over different networks to the backend server, the vending machine may reduce costs by reducing the amount of data transmitted over networks that require payments to transmit data. Furthermore, by relaying data over the different networks, the backend server may constantly receive data from the vending machine, which may reduce the likelihood that the vending machine is underserviced.

The operations of method 500 presented below are intended to be illustrative. In some embodiments, method 500 may be accomplished with one or more additional operations not described, and/or without one or more of the operations discussed. Additionally, the order in which the operations of method 500 are illustrated in FIG. 5 and described below is not intended to be limiting.

In some embodiments, method 500 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 500 in response to instructions stored electronically on an electronic storage medium. The one or more processing devices may include one or more devices configured through hardware, firmware, and/or software to be specifically designed for execution of one or more of the operations of method 500.

At operation 510, a user may create a profile with user information and payment information. The payment information may be stored within the backend server, and in implementations a prepaid balance may be created to the user and stored on a mobile application on a user computing device. Before completing a transaction, the prepaid balance may be synchronized with a backend server.

At operation 520, the user may perform actions on a graphical user interface to wirelessly connect a user computing device with a vending machine. Responsive to connecting the user computing device with the vending machine, the user may perform actions to make a selection of items stored at the vending machines.

At operation 530, the user computing device may receive information from the vending machine to deduct a price of the item from the balance.

At operation 540, once the balance of the user is updated, the vending of the item can be authorized by the vending machine device. Responsive to authorizing the vending of the item, the vending machine device may transmit determine if a quantity of the dispensed item fell below an item threshold associated with the dispensed item. Furthermore, the vending machine device may collector other information associated with the vending machine, such as an inventory report and/or error reports.

At operation 550, the user computing device may receive second data from the vending machine. The second data may include data indicating if the quantity of the dispensed item fell below the threshold for the item, the inventor report, and/or the error reports. The second data may be transmitted over a first network, which may be a closed loop network, such as Bluetooth, NFC or WiFi.

At operation 560, the user computing device may transmit the second data to a backend server over a second type of network, which may be a cellular network. Utilizing the user computing device, the vending machine may relay information to the backend server responsive to a transaction occurring that would change the inventory or status of the vending machine. Furthermore, utilizing the user computing device, the vending machine may be able to reduce data transfer costs and bandwidth for directly contacting the backend server. This may be crucial in situations where there are no closed looped networks that are accessible by the vending machine. The user computing device may also transmit payment and/or balance information to the backend server.

Figure 6:
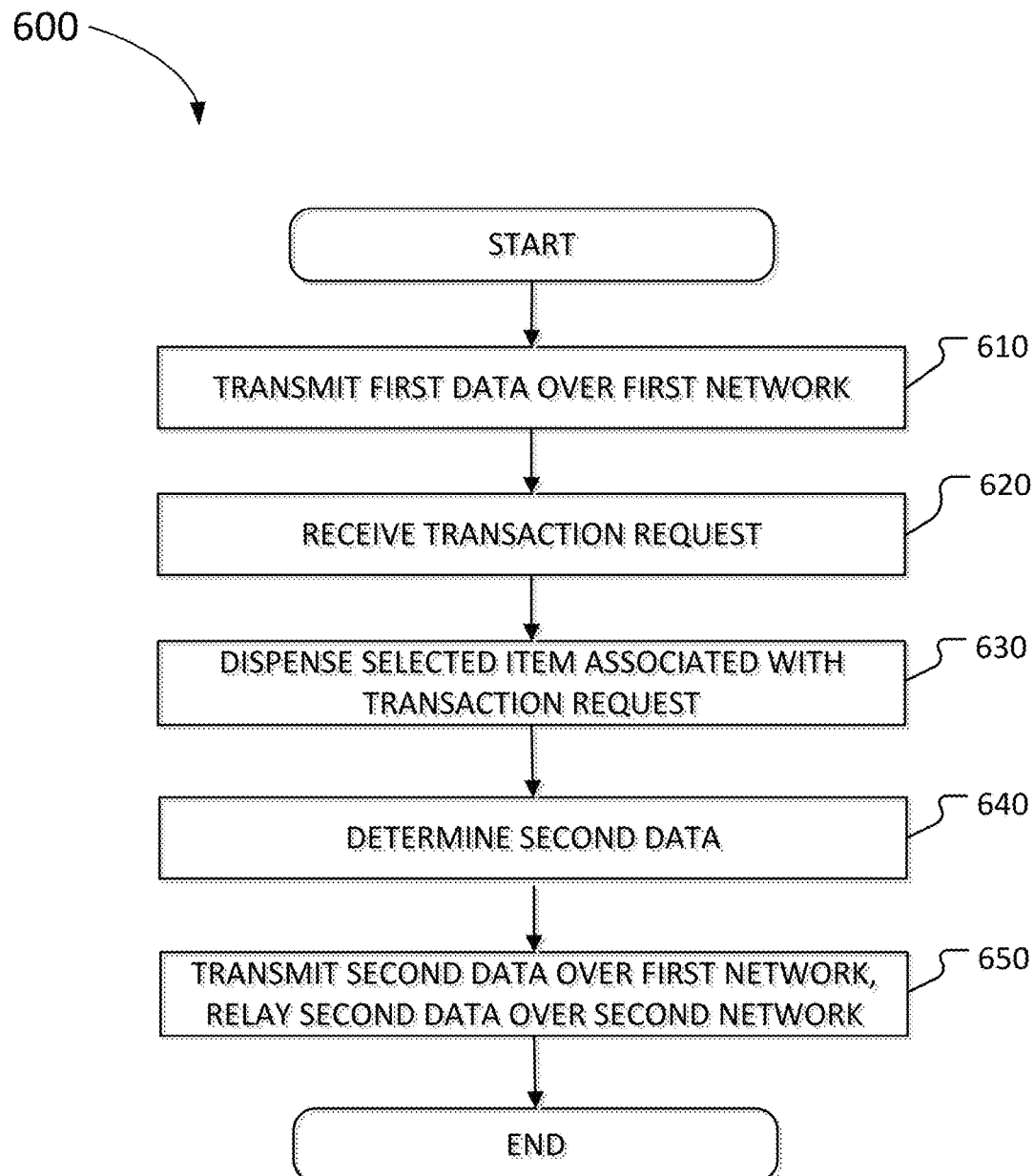
FIG. 6 illustrates a method for a vending machine computing device relaying data over different networks to a backend server, according to an embodiment.

FIG. 6 illustrates a method 600 for a vending machine computing device relaying data over different networks to a backend server, according to embodiments. By relaying data over different networks to the backend server, the vending machine may reduce costs by reducing the amount of data transmitted over networks that require payments to transmit data. Furthermore, by relaying data over the different networks, the backend server may constantly receive data from the vending machine, which may reduce the likelihood that the vending machine is underservices.

The operations of method 600 presented below are intended to be illustrative. In some embodiments, method 600 may be accomplished with one or more additional operations not described, and/or without one or more of the operations discussed. Additionally, the order in which the operations of method 600 are illustrated in FIG. 6 and described below is not intended to be limiting.

In some embodiments, method 600 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 600 in response to instructions stored electronically on an electronic storage medium. The one or more processing devices may include one or more devices configured through hardware, firmware, and/or software to be specifically designed for execution of one or more of the operations of method 600.

At operation 610, a vending machine computing device may transmit first data to a backend server over a first network and/or a second network. The first data may be configured to be transmitted to the backend server on scheduled intervals, such as every week. The first data may include a full inventory and status report, that includes the quantity of each of the items sold by the vending machine and a status of each denomination of currency held by the vending machine.

At operation 620, the vending machine computing device may receive a transaction request from a user computing device to complete a transaction. The transaction request may include a balance of the user and a customer selection.

At operation 630, the vending machine may determine if the user's balance is sufficient to purchase the selected item, which is selected using a graphical user interface on the vending machine, and if so dispense the selected item.

At operation 640, the vending machine computing device may determine a quantity information for all of the items stocked by the vending machine, determine if any quantities of items falls below a respective threshold, and determine a corresponding flag if the quantity for an item falls below a threshold. Furthermore, the vending machine computing device may determine if any other errors have occurred.

At operation 650, the vending machine computing device may transmit second data to the user computing device that performed the transaction. The second data may include a flag if the quantity of the purchased item falls below a corresponding threshold, information associated with errors, etc. The second data may be configured to be transmitted over the first network to the user computing device, and then transmitted over a second network to the backend server. In embodiments, the second data may include less data than the first data.

In the foregoing specification, embodiments have been described with reference to specific embodiments. However, one of ordinary skill in the art appreciates that various modifications and changes can be made without departing from the scope of the invention. Accordingly, the specification and figures are to be regarded in an illustrative rather than a restrictive sense, and all such modifications are intended to be included within the scope of the invention.

Although the invention has been described with respect to specific embodiments thereof, these embodiments are merely illustrative, and are thus not restrictive of the invention. The description herein of illustrated embodiments of the invention is not intended to be exhaustive or to limit the invention to the precise forms disclosed herein (in particular, the inclusion of any particular embodiment, feature, or function is not intended to limit the scope of the invention to such embodiment, feature, or function).

Rather, the description is intended to describe illustrative embodiments, features and functions in order to provide a person of ordinary skill in the art context to understand the invention without limiting the invention to any particularly described embodiment, feature, or function. While specific embodiments of, and examples for, the invention are described herein for illustrative purposes only, various equivalent modifications are possible within the spirit and scope of the invention, as those skilled in the relevant art will recognize and appreciate.

As indicated, these modifications may be made to the invention in light of the foregoing description of illustrated embodiments of the invention and are to be included within the spirit and scope of the invention. Thus, while the invention has been described herein with reference to particular embodiments thereof, a latitude of modification, various changes, and substitutions are intended in the foregoing disclosures. It will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the invention.

Reference throughout this specification to "one embodiment," "an embodiment," "a specific embodiment" or similar terminology means that a particular feature, structure, or characteristic described in connection with the embodiment is included in at least one embodiment and may not necessarily be present in all embodiments. Thus, respective appearances of the phrases "in one embodiment," "in an embodiment," or "in a specific embodiment" or similar terminology in various places throughout this specification are not necessarily referring to the same embodiment.

Furthermore, the particular features, structures, or characteristics of any particular embodiment may be combined in any suitable manner with one or more other embodiments. It is to be understood that other variations and modifications of the embodiments described and illustrated herein are possible in light of the teachings herein and are to be considered as part of the spirit and scope of the invention.

In the description herein, numerous specific details are provided, such as examples of components and/or methods, to provide a thorough understanding of embodiments of the invention. One skilled in the relevant art will recognize, however, that an embodiment may be able to be practiced without one or more of the specific details, or with other apparatus, systems, assemblies, methods, components, materials, parts, and/or the like. In other instances, well-known structures, components, systems, materials, or operations are not specifically shown or described in detail to avoid obscuring aspects of embodiments of the invention. While the invention may be illustrated by using a particular embodiment, this is not and does not limit the invention to any particular embodiment and a person of ordinary skill in the art will recognize that additional embodiments are readily understandable and are a part of this invention.

It will also be appreciated that one or more of the elements depicted in the drawings/figures can also be implemented in a more separated or integrated manner, or even removed or rendered as inoperable in certain cases, as is useful in accordance with a particular application. Additionally, any signal arrows in the drawings/figures should be considered only as exemplary, and not limiting, unless otherwise specifically noted.

Furthermore, the term "or" as used herein is generally intended to mean "and/or" unless otherwise indicated. As used herein, a term preceded by "a" or "an" (and "the" when antecedent basis is "a" or "an") includes both singular and plural of such term (i.e., that the reference "a" or "an" clearly indicates only the singular or only the plural). Also, as used in the description herein, the meaning of "in" includes "in" and "on" unless the context clearly dictates otherwise.

Benefits, other advantages, and solutions to problems have been described above with regard to specific embodiments. However, the benefits, advantages, solutions to problems, and any component(s) that may cause any benefit, advantage, or solution to occur or become more pronounced are not to be construed as a critical, required, or essential feature or component.

What is claimed:

1. A vending machine system comprising:
    a first network configured to transmit data over shorter distances;
    a second network configured to transmit data over longer distances;
    a vending machine configured to dispense items;
    a vending machine computing device installed locally within the vending machine, the vending machine computing device being configured to determine first data on a predetermined schedule, and second data responsive to a transaction, the second data including a flag indicating if an inventory of a first item within the vending machine is below a vending threshold responsive to completing a transaction associated with the first item, the first data requiring more data bandwidth than the second data, the first data including a full inventory of items currently located at the vending machine, a status of each denomination of currency located at the vending machine, and a quantity of items sold by the vending machine over a time period;
    a user computing device configured to wirelessly perform the transaction with the vending machine computing device to receive the first item from the vending machine, the user computing device being configured to receive the second data including the flag from the vending machine over the first network responsive to the transaction being performed, the user computing device being configured to relay the second data including the flag over the second network to a backend server after receiving the second data over the first network.

2. The system of claim 1, wherein the first network is a Bluetooth network, and the second network is a cellular network.

3. The system of claim 1, wherein the backend server is configured to manage configurations associated with the vending machine, the configurations including pricing of items carried by vending machine.

4. The system of claim 1, further comprising:
    a replenishment driver computing device that is configured to transmit an SMS message to the vending machine computing device, and receive the first data from the vending machine computing device responsive to transmitting the first data.

5. The system of claim 4, wherein the backend server is configured to transmit a first message to the replenishment driver computing device over the first network responsive to receiving the second data from the user computing device.

6. The system of claim 5, wherein the replenishment driver computing device is configured to modify the first data on the vending machine by transmitting a message to the vending machine computing device over the first network or the second network.

7. The system of claim 1, wherein the backend server is configured to modify the first data on the vending machine computing device responsive to receiving the second data.

8. The system of claim 1, wherein the first data includes an inventory and quantity numbers of items currently housed in the vending machine.

9. The system of claim 1, wherein the vending machine computing device is configured to transmit the first data to the backend server over the first network and the second network.

10. The system of claim 1, wherein the user computer device is configured to complete the transaction with the vending machine computing device while being offline the second network, and the user computing device is computing device is configured to transmit the second data responsive to being online the second network.

11. A method for utilizing a vending machine system comprising:
    installing a vending machine computing device inside a vending machine that is configured to dispense items;
    determining, by the vending machine computing device, first data on a predetermined schedule;
    determining, by the vending machine computing device, second data responsive to completing a transaction, the second data including a flag indicating if an inventory of a first item within the vending machine is below a vending threshold responsive to completing a transaction associated with the first item, the first data requiring more data bandwidth than the second data, the first data including a full inventory of items currently located at the vending machine, a status of each denomination of currency located at the vending machine, and a quantity of items sold by the vending machine over a time period;
    completing the transaction wirelessly utilizing a user computing device and the vending machine computing device to receive the first item from the vending machine;
    transmitting the second data including the flag over a first network from the vending machine computing device to the user computer device responsive to completing the transaction, the first being configured to transmit data over shorter distances;
    relaying the second data including the flag over a second network from the user computing device to a backend server after receiving the second data over the first network, the second network configured to transmit data over longer distances.

12. The method of claim 11, wherein the first network is a Bluetooth network, and the second network is a cellular network.

13. The method of claim 11, further comprising:
    managing, via the backend server, configurations associated with the vending machine, the configurations including pricing of items carried by vending machine.

14. The method of claim 11, further comprising:
    transmitting, by a replenishment driver computing device, an SMS message to the vending machine computing device; and
    receiving, by the replenishment driver computing device, the first data from the vending machine computing device responsive to transmitting the first data.

15. The method of claim 14, further comprising:
    transmitting, by the backend server, a first message to the replenishment driver computing device over the first network responsive to receiving the second data from the user computing device.

16. The method of claim 15, further comprising:
modifying, via the replenishment driver computing device, the first data on the vending machine by transmitting a message to the vending machine computing device over the first network or the second network.

17. The method of claim 11, further comprising:
modifying, via the backend server, the first data on the vending machine computing device responsive to receiving the second data.

18. The method of claim 11, wherein the first data includes an inventory and quantity numbers of items currently housed in the vending machine.

19. The method of claim 11, further comprising:
transmitting, by the vending machine computing device, the first data to the backend server over the first network and the second network.

20. The method of claim 11, wherein the transaction is configured to be completed by the user computing device while the user computer device is offline the second network, and the user computing device is computing device is configured to transmit the second data responsive to being online the second network.

* * * * *